(12) United States Patent
Desai

(10) Patent No.: US 11,165,704 B2
(45) Date of Patent: Nov. 2, 2021

(54) ADAPTIVE ENCODING NETWORK

(71) Applicant: eBay Inc., San Jose, CA (US)

(72) Inventor: Amit Yogendra Desai, Fremont, CA (US)

(73) Assignee: eBay Inc., San Jose, CA (US)

( * ) Notice: Subject to any disclaimer, the term of this patent is extended or adjusted under 35 U.S.C. 154(b) by 156 days.

(21) Appl. No.: 16/398,727

(22) Filed: Apr. 30, 2019

(65) Prior Publication Data

US 2020/0351202 A1 Nov. 5, 2020

(51) Int. Cl.
*G06F 15/16* (2006.01)
*H04L 12/801* (2013.01)
*H04L 12/58* (2006.01)
*H04L 29/08* (2006.01)

(52) U.S. Cl.
CPC .............. *H04L 47/12* (2013.01); *H04L 51/04* (2013.01); *H04L 67/20* (2013.01)

(58) Field of Classification Search
CPC . G06F 9/54; H04L 47/12; H04L 51/04; H04L 67/20; H04L 69/04
See application file for complete search history.

(56) References Cited

U.S. PATENT DOCUMENTS

| 6,919,826 | B1 | 7/2005 | Peacock | |
|---|---|---|---|---|
| 8,704,685 | B2 | 4/2014 | Kataoka | |
| 2012/0170571 | A1* | 7/2012 | Antonelli | H04L 69/04 370/352 |
| 2012/0296983 | A1* | 11/2012 | Boehm | H03M 7/3088 709/206 |

FOREIGN PATENT DOCUMENTS

WO 2020/222907 A1 11/2020

OTHER PUBLICATIONS

IBM,"Adaptive compression", DB2 Version 10.1 for Linux, UNIX, and Windows, Accessed on Feb. 7, 2019, 4 pages.
Wikipedia,"Huffman Coding", Retrieved from the Internet URL: <https://en.wikipedia.org/wiki/Huffman_coding>, Accessed on Feb. 7, 2019, 10 pages.
International Search report received for PCT Patent Application No. PCT/US2020/020849, dated Jun. 16, 2020, 3 Pages.
Written Opinion received for PCT Patent Application No. PCT/US2020/020849, dated Jun. 16, 2020, 6 Pages.

* cited by examiner

*Primary Examiner* — Normin Abedin
(74) *Attorney, Agent, or Firm* — FIG. 1 Patents

(57) ABSTRACT

Systems and methods of improving the functioning of a computer system by implementing an adaptive encoding network are disclosed. In some example embodiments, a computer system transmits a new encoding assignment representing an encoding of a value with a new code to a consensus server, receives an approval of the new encoding assignment from the consensus server, and, based on the receiving of the approval of the new encoding assignment from the consensus server, applies the new encoding assignment to the value in subsequent messages to one or more machines, with the applying of the new encoding assignment comprising including the new code of the new encoding assignment in the subsequent messages in association with the value.

20 Claims, 12 Drawing Sheets

| VALUE | COUNT | ENCODING | STATE |
|---|---|---|---|
| USD | 45987 | 00000001 | CONSENSUS_APPROVED |
| CAD | 8821 | 00000010 | CONSENSUS_REQUESTED |
| INR | 27 | N/A | INELIGIBLE |
| ... | ... | ... | ... |

FIG. 3

ADAPTIVE ENCODING NETWORK

TECHNICAL FIELD

Embodiments of the present disclosure relate generally to the technical field of an electrical computer system architecture and, more particularly, but not by way of limitation, to systems and methods of improving the functioning of a computer system using an adaptive encoding network.

BACKGROUND

The functioning of computer systems is often burdened by large amounts of data that are transmitted between machines, nodes, queues, caches, and other entities, thereby excessively consuming important bandwidth and resulting in system and network latency. Current solutions involving encoding of the data prior to transmission to reduce the size of the transmitted message are too static to be effective or efficient, failing to take into account dynamic aspects involved in data transmission. Computer systems that implement such encoding solutions are dependent on specific configuration of the static encoding scheme by a user, preventing the computer systems from adapting to events in real-time. Other technical problems can arise as well.

BRIEF DESCRIPTION OF THE DRAWINGS

Some embodiments of the present disclosure are illustrated by way of example and not limitation in the figures of the accompanying drawings, in which like reference numbers indicate similar elements.

FIG. 3 illustrates tracking data for encoding assignments, in accordance with some example embodiments.

DETAILED DESCRIPTION

Figure 1:
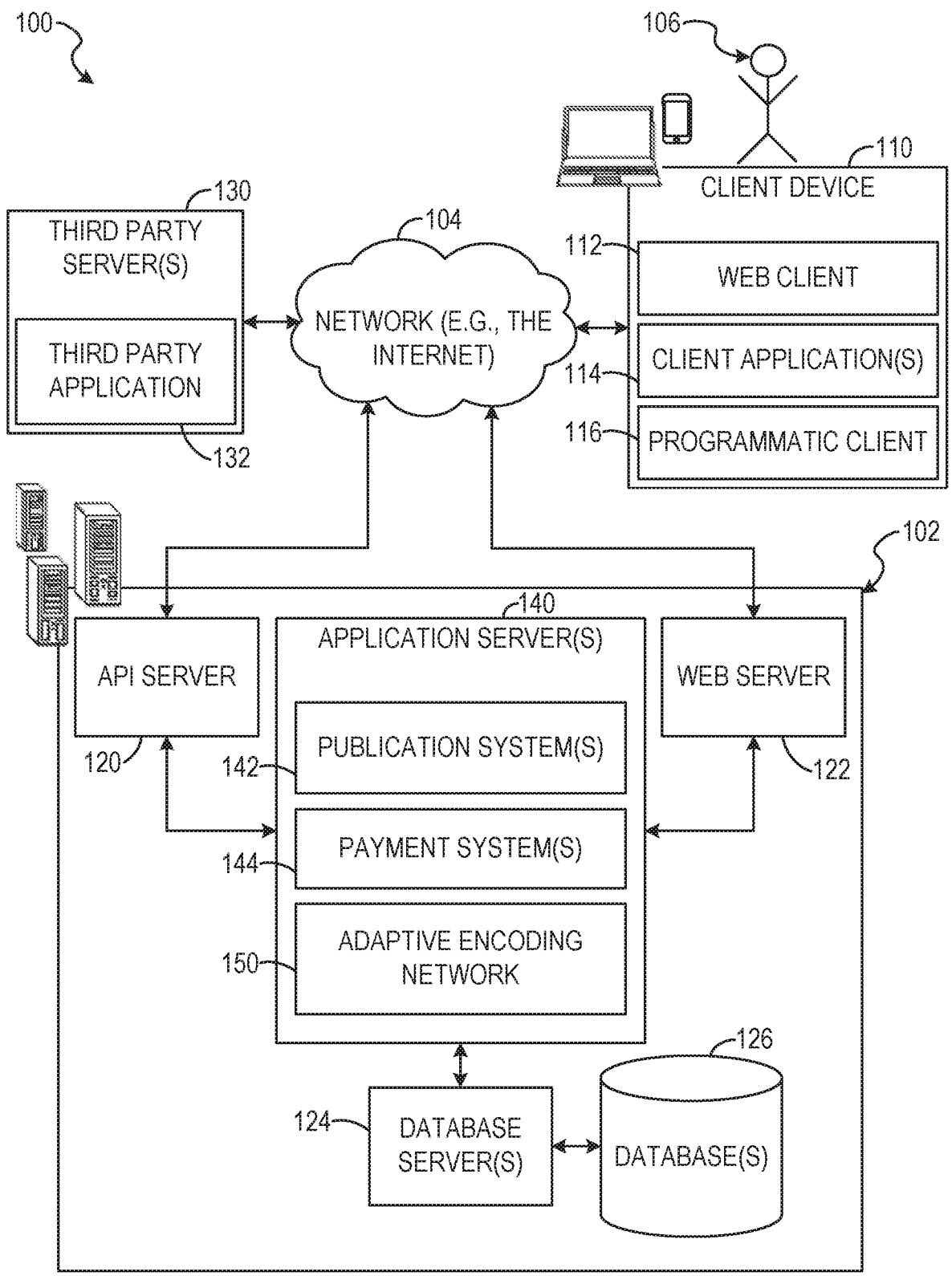
FIG. 1 is a block diagram illustrating a networked system, in accordance with some example embodiments.

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art that embodiments of the inventive subject matter can be practiced without these specific details. In general, well-known instruction instances, protocols, structures, and techniques have not been shown in detail.

The present disclosure provides technical solutions for improving the functioning of a computer system by implementing an adaptive encoding network. In some example embodiments, the adaptive encoding network provides dynamic encoding of frequently communicated message parts (e.g., values in the message) between machines, using a consensus server to agree on the encoding for the specific message parts. In one example embodiment of the adaptive encoding network, a first machine communicates with one or more other machines. The first machine tracks the counts of all the values in the messages during a sliding window of time, such as the number of times a particular value (e.g., 'USD') has been used in messages during the last 3 hours. Using heuristics, the first machine determines that an encoding should be assigned to the particular value based on the tracked count for the value satisfying a threshold value (e.g., 'USD' being used more than 1000 times in the last 3 hours). The first machine sends a proposed encoding assignment (e.g., 'USD'=0000001) to the consensus server for approval. The consensus server either approves or rejects proposed encoding assignments from different machines based on a consensus protocol. If multiple machines send different proposed encoding assignments for the same value at approximately the same time, then the consensus server approves one and rejects the other(s). If the consensus server approves a proposed encoding assignment for a particular value, then the approved encoding assignment is used in subsequent messages between machines of the adaptive encoding network.

Additionally, during a short set or fixed window of time after the consensus server approves a proposed encoding assignment for a value from a machine, the machine may include in its subsequent messages involving that value (1) the new encoded version of the value based on the new encoding assignment, and (2) the old encoded version of the value. Furthermore, in order to avoid write amplification, the machine may wait to apply the new encoded assignment (e.g., approved by the consensus server) until the application of the new encoded assignment is within a non-peak window, which may be determined by the amount of network traffic (e.g., waiting to apply the encoding assignment in messages until network traffic is sufficiently low).

The implementation of the features disclosed herein involves a non-generic, unconventional, and non-routine operation or combination of operations. By applying one or more of the solutions disclosed herein, some technical effects of the system and method of the present disclosure are to provide dynamic adaptable encoding of data values for message transmission that reduces network bandwidth consumption and network latency. Additional technical effects of the system and method of the present disclosure are to optimize encoding by selectively encoding data based on usage of the data rather than blindly applying a static encoding scheme to all data. As a result, the functioning of the computer system is improved. Other improvements to the functioning of a computer or machine are also apparent from this disclosure.

In some example embodiments, operations are performed by a computer system or other machine having a memory and at least one hardware processor, with the operations comprising: transmitting, by a first machine having a memory and at least one hardware processor, a new encoding assignment for a value to a consensus server, the new encoding assignment representing an encoding of the value with a new code; receiving, by the first machine, an approval of the new encoding assignment from the consensus server; and based on the receiving of the approval of the new encoding assignment from the consensus server, applying, by the first machine, the new encoding assignment to the value in subsequent messages from the first machine to one or more other machines, the applying of the new encoding assignment comprising including the new code of the new encoding assignment in the subsequent messages in association with the value. In some example embodiments, the applying the new encoding assignment further comprises including a version identifier for the new code in the subsequent messages.

In some example embodiments, the operations further comprise tracking, by the first machine, a number of times the value is included in messages that are transmitted during a first window of time, wherein the transmitting of the new coding assignment for the value to the consensus server is based on the tracked number of times satisfying a threshold number of times.

In some example embodiments, the applying the encoding assignment further comprises including an old code of an old encoding assignment in the subsequent messages in association with the value, the old encoding assignment having been previously approved by the consensus server and applied to previous messages from the first machine to the one or more other machines prior to the approval of the new encoding assignment. In some example embodiments, the applying the new encoding assignment further comprises including a version identifier for the new code and another version identifier for the old code in the subsequent messages.

In some example embodiments, the applying the new encoding assignment further comprises: determining a non-peak window of time based on the non-peak window of time having an amount of network traffic that is below a threshold amount of network traffic; and waiting to apply the new encoding assignment until the non-peak window of time.

In some example embodiments, the operations further comprise: transmitting, by the first machine, another new encoding assignment for the value to the consensus server, the other new encoding assignment representing another encoding of the value with another new code; receiving, by the first machine, a rejection of the other new encoding assignment from the consensus server; and based on the receiving of the rejection of the other new encoding assignment from the consensus server, applying, by the first machine, the new encoding assignment to the value instead of the other new encoding assignment in subsequent messages from the first machine to the one or more other machines.

The methods or embodiments disclosed herein can be implemented as a computer system having one or more modules (e.g., hardware modules or software modules). Such modules can be executed by one or more hardware processors of the computer system. The methods or embodiments disclosed herein can be embodied as instructions stored on a machine-readable medium that, when executed by one or more processors, cause the one or more processors to perform the instructions.

With reference to FIG. 1, an example embodiment of a high-level client-server-based network architecture 100 is shown. A networked system 102, in the example forms of a network-based marketplace or payment system, provides server-side functionality via a network 104 (e.g., the Internet or wide area network (WAN)) to one or more client devices 110. FIG. 1 illustrates, for example, a web client 112 (e.g., a browser, such as the Internet Explorer® browser developed by Microsoft® Corporation of Redmond, Wash. State), an application 114, and a programmatic client 116 executing on client device 110.

The client device 110 may comprise, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may utilize to access the networked system 102. In some embodiments, the client device 110 may comprise a display module (not shown) to display information (e.g., in the form of user interfaces). In further embodiments, the client device 110 may comprise one or more of a touch screens, accelerometers, gyroscopes, cameras, microphones, global positioning system (GPS) devices, and so forth. The client device 110 may be a device of a user that is used to perform a transaction involving digital items within the networked system 102. In one embodiment, the networked system 102 is a network-based marketplace that responds to requests for product listings, publishes publications comprising item listings of products available on the network-based marketplace, and manages payments for these marketplace transactions. One or more users 106 may be a person, a machine, or other means of interacting with client device 110. In embodiments, the user 106 is not part of the network architecture 100, but may interact with the network architecture 100 via client device 110 or another means. For example, one or more portions of network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

Each client device 110 may include one or more applications (also referred to as "apps") such as, but not limited to, a web browser, messaging application, electronic mail (email) application, an e-commerce site application (also referred to as a marketplace application), and the like. In some embodiments, if the e-commerce site application is included in a given client device 110, then this application is configured to locally provide the user interface and at least some of the functionalities with the application configured to communicate with the networked system 102, on an as needed basis, for data and/or processing capabilities not locally available (e.g., access to a database of items available for sale, to authenticate a user, to verify a method of payment, etc.). Conversely if the e-commerce site application is not included in the client device 110, the client device 110 may use its web browser to access the e-commerce site (or a variant thereof) hosted on the networked system 102.

One or more users 106 may be a person, a machine, or other means of interacting with the client device 110. In example embodiments, the user 106 is not part of the network architecture 100, but may interact with the network architecture 100 via the client device 110 or other means. For instance, the user 106 provides input (e.g., touch screen input or alphanumeric input) to the client device 110 and the input is communicated to the networked system 102 via the network 104. In this instance, the networked system 102, in response to receiving the input from the user 106, communicates information to the client device 110 via the network 104 to be presented to the user 106. In this way, the user 106 can interact with the networked system 102 using the client device 110.

An application program interface (API) server 120 and a web server 122 are coupled to, and provide programmatic and web interfaces respectively to, one or more application servers 140. The application servers 140 may host one or more publication systems 142, payment systems 144, and a adaptive encoding network 150, each of which may comprise one or more modules or applications and each of which may be embodied as hardware, software, firmware, or any combination thereof. The application servers 140 are, in turn, shown to be coupled to one or more database servers 124 that facilitate access to one or more information storage repositories or database(s) 126. In an example embodiment, the databases 126 are storage devices that store information to be posted (e.g., publications or listings) to the publication system 142. The databases 126 may also store digital item information in accordance with example embodiments.

Additionally, a third party application 132, executing on third party server(s) 130, is shown as having programmatic access to the networked system 102 via the programmatic interface provided by the API server 120. For example, the third party application 132, utilizing information retrieved from the networked system 102, supports one or more features or functions on a website hosted by the third party. The third party website, for example, provides one or more promotional, marketplace, or payment functions that are supported by the relevant applications of the networked system 102.

The publication systems 142 may provide a number of publication functions and services to users 106 that access the networked system 102. The payment systems 144 may likewise provide a number of functions to perform or facilitate payments and transactions. While the publication system 142 and payment system 144 are shown in FIG. 1 to both form part of the networked system 102, it will be appreciated that, in alternative embodiments, each system 142 and 144 may form part of a payment service that is separate and distinct from the networked system 102. In some embodiments, the payment systems 144 may form part of the publication system 142.

The adaptive encoding network 150 provides functionality operable to perform various adaptive encoding operations, as will be discussed in further detail below. The adaptive encoding network 150 may access the data from the databases 126, the third party servers 130, the publication system 142, and other sources. In some embodiments, the adaptive encoding network 150 may analyze the data to perform adaptive encoding operations. In some example embodiments, the adaptive encoding network 150 communicates with the publication systems 142 (e.g., accessing item listings) and payment system 144. In an alternative embodiment, the adaptive encoding network 150 is a part of the publication system 142.

Further, while the client-server-based network architecture 100 shown in FIG. 1 employs a client-server architecture, the present inventive subject matter is of course not limited to such an architecture, and could equally well find application in a distributed, or peer-to-peer, architecture system, for example. The various publication system 142, payment system 144, and adaptive encoding network 150 could also be implemented as standalone software programs, which do not necessarily have networking capabilities.

The web client 112 may access the various publication and payment systems 142 and 144 via the web interface supported by the web server 122. Similarly, the programmatic client 116 accesses the various services and functions provided by the publication and payment systems 142 and 144 via the programmatic interface provided by the API server 120. The programmatic client 116 may, for example, be a seller application (e.g., the Turbo Lister application developed by eBay® Inc., of San Jose, Calif.) to enable sellers to author and manage listings on the networked system 102 in an off-line manner, and to perform batch-mode communications between the programmatic client 116 and the networked system 102.

Additionally, a third party application(s) 132, executing on a third party server(s) 130, is shown as having programmatic access to the networked system 102 via the programmatic interface provided by the API server 120. For example, the third party application 132, utilizing information retrieved from the networked system 102, may support one or more features or functions on a website hosted by the third party. The third party website may, for example, provide one or more promotional, marketplace, or payment functions that are supported by the relevant applications of the networked system 102.

Figure 2:
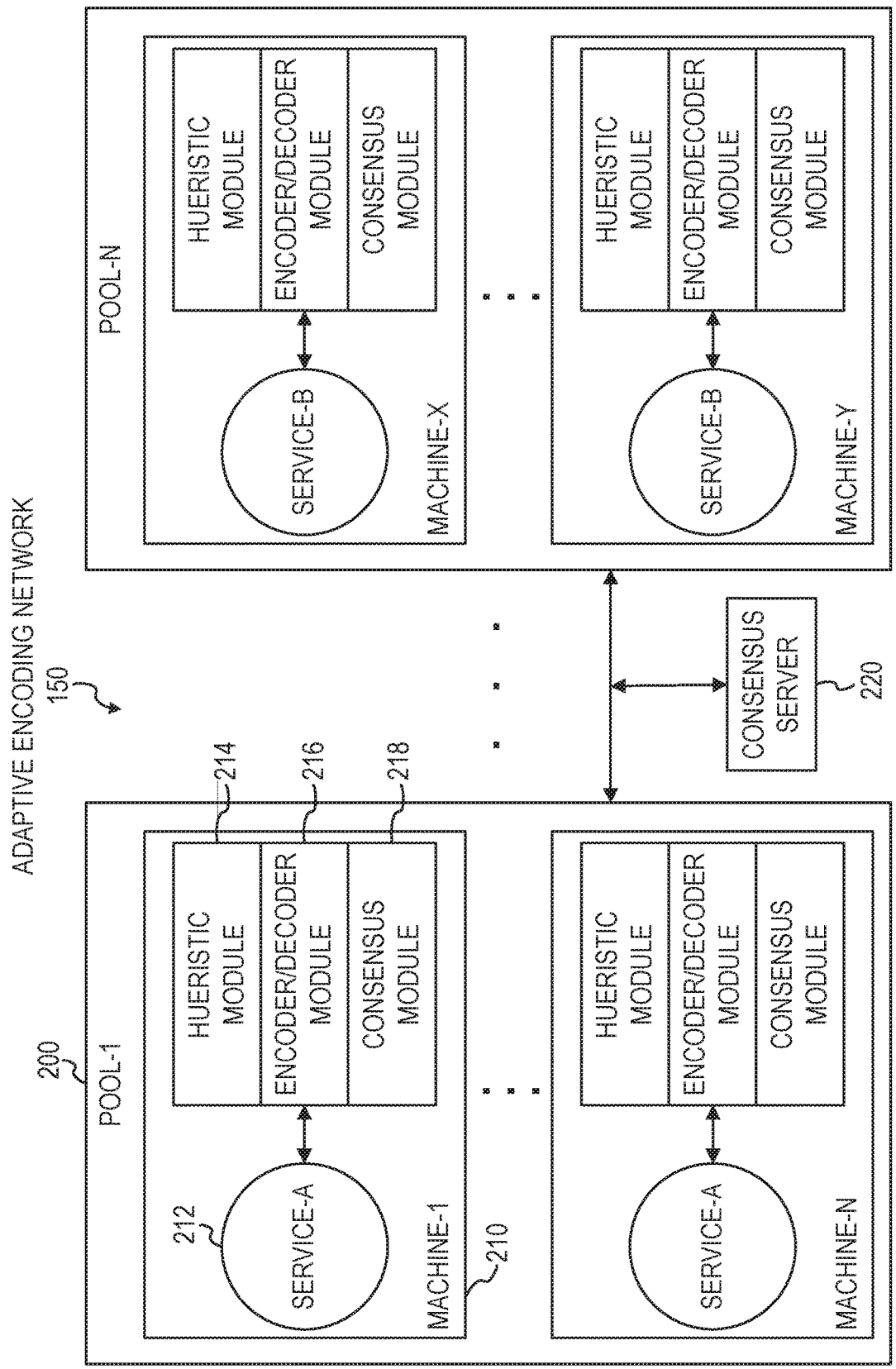
FIG. 2 illustrates components of an adaptive encoding network, in accordance with some example embodiments.

FIG. 2 illustrates components of the adaptive encoding network 150, in accordance with some example embodiments. In FIG. 2, the adaptive encoding network 150 is implemented in a system environment comprising a plurality of pools 200 of machines 210. For example, the system environment may comprise a plurality of pools 200 (e.g., POOL-1 to POOL-N in FIG. 2), and each pool 200 may comprise its own plurality of machines 210 (e.g., MACHINE-1 to MACHINE-N for POOL-1 and MACHINE-X to MACHINE-Y for POOL-N in FIG. 2). In some example embodiments, each pool 200 may be directed to and provide a particular service 212. In the example shown in FIG. 2, the machines 210 of POOL-1 provide SERVICE-A (e.g., a pricing service), while the machines 210 of POOL-N provide SERVICE-B (e.g., a selling service). In implementing their respective services 212, the machines 210 may request data values from one another, as well as respond to such data requests, such as via a communication network (e.g., the network 104 in FIG. 1).

In some example embodiments, the adaptive encoding network 150 comprises any combination of one or more of a heuristic module 214, an encoder/decoder module 216, a consensus module 218, and a consensus server 220. Each machine 210 may comprise its own corresponding heuristic module 214, encoder/decoder module 216, and consensus module 218 communicatively coupled to each other on the machine 210, such as via a communication network, and the consensus server 220 may be communicatively coupled to each machine 210, such as via a communication network. In addition to or as an alternative to being implemented on the machine 210, in some example embodiments, the heuristic module 214, the encoder/decoder module 216, and the consensus module 218 are implemented on other entities as well. Examples of other such entities include, but are not limited to, nodes, queues, and caches.

In some example embodiments, the heuristic module 214 of the machine 210 is configured to track a number of times a value (e.g., a data value) is included in messages that are transmitted from the machine 210 during a window of time. This tracked number of times is also referred to herein as a count. Since network data is often expressed as key/value pairs, in some example embodiments, the heuristic module 214 is configured to track counts of all values for a key transmitted from the machine 210 in a sliding window of time, such as the usage of each value within the last two hours, and then employ heuristics to determine, for each value, whether a new encoding assignment for the value should be implemented. An encoding assignment represents an encoding of the value with a new code. For example, different values for a key of "listing_currency" may comprise "USD" and "CAD." The value of "USD" may be encoded with code "00000001," while the value of "CAD" may be encoded with code "00000010."

In some example embodiments, the heuristic module 214 determines whether a new encoding assignment should be implemented for the value based on whether the count for the value satisfies a threshold value. For example, if the count for the value does not satisfy the threshold value (e.g., a count of at least one-hundred), then the heuristic module 214 determines that a new encoding assignment should not be implemented for the value and continues to track the count for the value. However, if the count for the value does satisfy the threshold value, then the heuristic module 214 determines that a new encoding assignment should be implemented for the value. In some example embodiments, in response to or otherwise based on the determination that the new encoding assignment should be implemented for the value, the consensus module 218 transmits the proposed new encoding assignment to the consensus server 220 for approval in order to avoid situations in which different machines that communicate with each other are using different encoding assignments for the same value. By first obtaining approval for the new encoding assignment from the consensus server 220 before implementing the new encoding assignment for subsequent message, the machine 210 avoids data communication errors with other machines 210, thereby making communication between the machines 210 more efficient.

In some example embodiments, the consensus server 220 is configured to receive proposed new encoding assignments from the machines 210 and to determine whether to approve or reject each proposed new encoding assignment using a consensus protocol configured to determine which encoding assignments should be implemented across the pools 200 of machines 210. The consensus protocol is configured to ensure that multiple different encoding assignments are not concurrently implemented for the same value. In some example embodiments, in response to, or otherwise based on, receiving the proposed new encoding assignment for a specific value from the machine 210, the consensus server 220 checks to see if it has received another proposed new encoding assignment for the same specific value from another machine 210 at the same time or within a particular amount of time from each other (e.g., different proposed new encoding assignments received from different machines within thirty seconds of one another). If there is no other conflicting proposed new encoding assignment for the same value (e.g., no other new encoding assignment that has been proposed by another machine 210 at the same time or within a threshold amount of time), then the consensus server 220 approves the new encoding assignment proposed by the machine 210, and transmits its approval of the new encoding assignment to the machine 210. If there is a conflicting proposed new encoding assignment for the same value (e.g., another new encoding assignment has been proposed by another machine 210 at the same time or within the threshold amount of time), then the consensus server 220 uses the consensus protocol to select one of the proposed new encoding assignments for the value to be approves, rejects other proposed new encoding assignments for the value, and then transmits the approval and rejection(s) to the corresponding machines 210. In some example embodiments, the consensus server 220 randomly selects one of the new encoding assignments when there is a conflict. However, it is contemplated that the consensus protocol may dictate other ways of selecting an encoding assignment to approve when there is a conflict.

In some example embodiments, service calls between the services 212 of the machines 210 are passed through the encoder/decoder module 216 before being transmitted to other machines 210. The encoder/decoder module 216 may manage a list of encoding assignments for values in order to properly encode values included in messages transmitted from the machine 210 on which the encoder/decoder module 216 resides to other machines 210 and to properly decode values included in messages being transmitted from other machines 210 to the machine 210 on which the encoder/decoder module 216 resides. In some example embodiments, the encoder/decoder module 210 communicates with the consensus server periodically to obtain the latest versions of the encoding assignments for values, and then stores the latest versions of the encoding assignments for subsequent use in encoding and decoding the values that are included in messages between the machines 210.

The encoder/decoder module 216 may be configured to store the different versions of the encoding assignments for each value in association with the values and the encoding assignments, as well as corresponding versions identifiers (e.g., version 1, versions 2, ..., version N). In some example embodiments, the encoder/decoder module 216 is configured to, based on the receiving of the approval of a new encoding assignment from the consensus server 220, apply the new encoding assignment to the value in subsequent messages. The applying of the new encoding assignment may comprise including the new code of the new encoding assignment in the subsequent messages in association with the value. In some example embodiments, the applying of the new encoding assignment further comprises including a version identifier for the new code in association with the new code in the subsequent messages. In some example embodiments, the applying the encoding assignment further comprises including an old code of an old encoding assignment in the subsequent messages in association with the value, where the old encoding assignment has been previously approved by the consensus server and applied to previous messages from the machine 210 to one or more other machines 210 prior to the approval of the new encoding assignment. A version identifier for the new code and another version identifier for the old code may be included in the subsequent messages.

In some example embodiments, following approval of a new encoding assignment for a value, the encoder/decoder module 216 delays application of the new encoding assignment for a period of time until network traffic is determined to be at an appropriate level. For example, the encoder/decoder module 216 may determine a non-peak window of time based on the non-peak window of time having an amount of network traffic that is below a threshold amount of network traffic, and then wait to apply the new encoding assignment until the non-peak window of time.

FIG. 3 illustrates tracking data 300 for encoding assignments, in accordance with some example embodiments. The tracking data may be stored in the machines 210 for access by the modules of the machines 210 in processing messages transmitted between the machines 210. In some example embodiments, the tracking data 300 comprises different values with corresponding counts for each value. For example, in FIG. 3, a count of "45987" is stored in association with the value "USD" and a count of "8821" is stored in association with the value "CAD." The tracking data 300 may also comprise corresponding encodings for each value stored in association with each value. For example, in FIG. 3, the value "USD" has a corresponding encoding assignment of "00000001" and the value "CAD" has a corresponding encoding of "00000010." In FIG. 3, the value "INR" does not have a corresponding encoding assignment because it has been determined that the count for the value "INR" is too low for an encoding assignment to be generated and sent for approval to the consensus server 220. The tracking data 300 may further comprise a corresponding state of each encoding assignment, such as whether the encoding assignment has been approved (e.g., "CONSENSUS_APPROVED" in FIG. 3) or whether the encoding assignment has been transmitted to the consensus server 220 for approval, but a decision by the consensus server 220 has not yet been received (e.g., "CONSENSUS_REQUESTED" in FIG. 3), or whether a value in ineligible for an encoding assignment at the current time (e.g., "INELGIBILE" in FIG. 3). In some example embodiments, each machine 210 stores the tracking data 300 corresponding to encoding assignments that it has proposed to the consensus server 220. Each machine 210 may also store tracking data 300 for encoding assignments that have been proposed by other machines 210 and approved by consensus server 220.

In some example embodiments, the application of an encoding assignment comprises replacing a value in a message with a code. For example, a text-based representation of a value may be replaced with a binary code. In one example of a message from a seller service to a pricing serving for an item listing having an identification number of "123," the message may include a value for currency for the item listing without applying any encoding assignment, as follows:

```
{
    "id" : "123",
    "listing_currency" : "USD"
}
```

In a subsequent message, an encoding assignment may be applied to the value for currency for the item listing, in which the value for the currency is represented as a binary code, as follows:

```
{
    "id" : "123",
    "listing_currency" : "[binary-00000001]"
}
```

Figure 4:
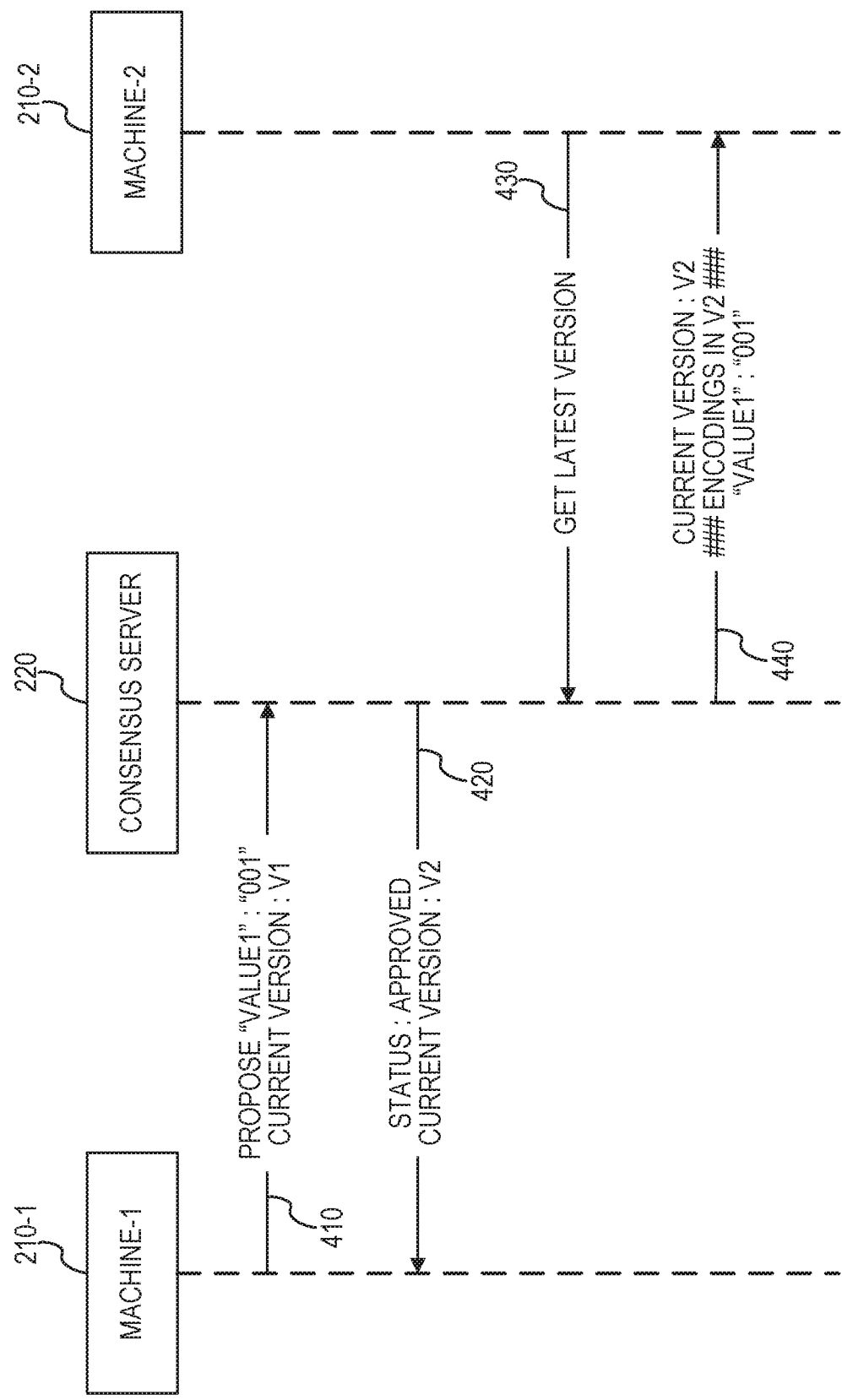
FIG. 4 illustrates a sequence diagram for a use case of the adaptive encoding network in which the latest encoding versions are polled at regular intervals, in accordance with some example embodiments.

FIG. 4 illustrates a sequence diagram for a use case of the adaptive encoding network in which the latest encoding versions are polled at regular intervals, in accordance with some example embodiments. In FIG. 4, two different machines 210-1 and 210-2 are using the features of the adaptive encoding network 150 along with the consensus server 220. In one example, a first version (V1) of an encoding assignment is currently being implemented for VALUE1. At operation 410, the machine 210-1 transmits a proposal for a new encoding assignment for VALUE1 in which VALUE1 is to be encoded as "001". This transmitted proposal at operation 410 may include the version identifier (V1) of the encoding assignment currently being implemented. At operation 420, the consensus server 220 approves the encoding assignment proposed by the machine 210-1 and transmits the approval to the machine 210-1 along with a version identifier (V2) for the new current encoding assignment that has just been approved by the consensus server 220. Both the consensus server 220 and the machine 210-1 may store the new encoding assignment ("VALUE1": "001") along with its corresponding version identifier (V2). At operation 430, the machine 210-2 communicates with the consensus server 220 to obtain the latest version of any encoding assignments being implemented within the adaptive encoding network 150, and, at operation 440, the consensus server 220 transmits the new encoding assignment of VALUE1 along with the corresponding version identifier. The machines 210-1 and 210-2 may then use the new encoding assignment "VALUE1": "001."

Figure 5:
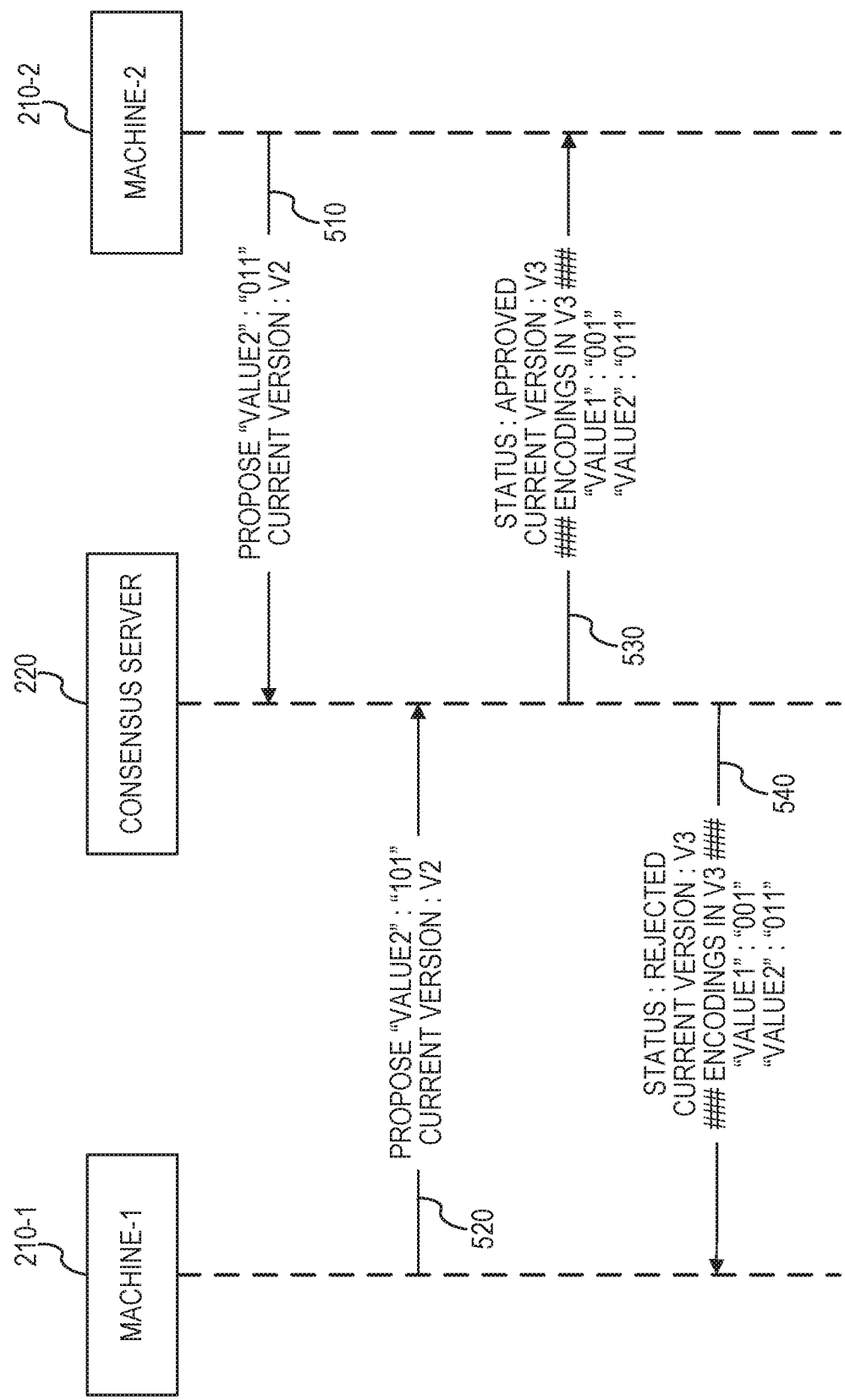
FIG. 5 illustrates a sequence diagram for a use case of the adaptive encoding network in which there is a consensus conflict based on different encodings being proposed by different machines at the same time, in accordance with some example embodiments.

FIG. 5 illustrates a sequence diagram for a use case of the adaptive encoding network in which there is a consensus conflict based on different encodings being proposed by different machines at the same time, in accordance with some example embodiments. In one example, a second version (V2) of an encoding assignment is currently being implemented for VALUE2. At operation 510, the machine 210-2 transmits a proposal for a new encoding assignment for VALUE2 in which VALUE2 is to be encoded as "011". This transmitted proposal at operation 510 may include the version identifier (V2) of the encoding assignment currently being implemented. At operation 520, the machine 210-1 also transmits a proposal for a new encoding assignment for VALUE2 in which VALUE2 is to be encoded as "101". This transmitted proposal at operation 520 may include the version identifier (V2) of the encoding assignment currently being implemented. In one example in which the new encoding assignments for VALUE2 are proposed by the machine 210-1 and the machine 210-2 to the consensus server 220 at the same time or within a particular amount of time of one another, the consensus server 220 approves one of the proposed encoding assignments and rejects the other proposed encoding assignment. For example, at operation 530, the consensus server 220 approves the encoding assignment proposed by the machine 210-2 and transmits the approval to the machine 210-2 along with a version identifier (V3) for the new current encoding assignment that has just been approved by the consensus server 220. And, at operation 540, the consensus server 220 rejects the encoding assignment proposed by the machine 210-1 and transmits the rejection to the machine 210-1.

Both the approval transmitted to the machine 210-2 and the rejection transmitted to the machine 210-1 may include a version identifier (V3) for the new current encoding assignment that has just been approved by the consensus server 220, as well as all of the current encoding assignments being implemented within the adaptive encoding network 150. The consensus server 220, the machine 210-1, and the machine 210-2 may store the new encoding assignment ("VALUE2" "011") along with its corresponding version identifier (V3) for subsequent use, such as for use by the corresponding encoder/decoder module 216 of the machines 210-1 and 210-2.

Figure 6:
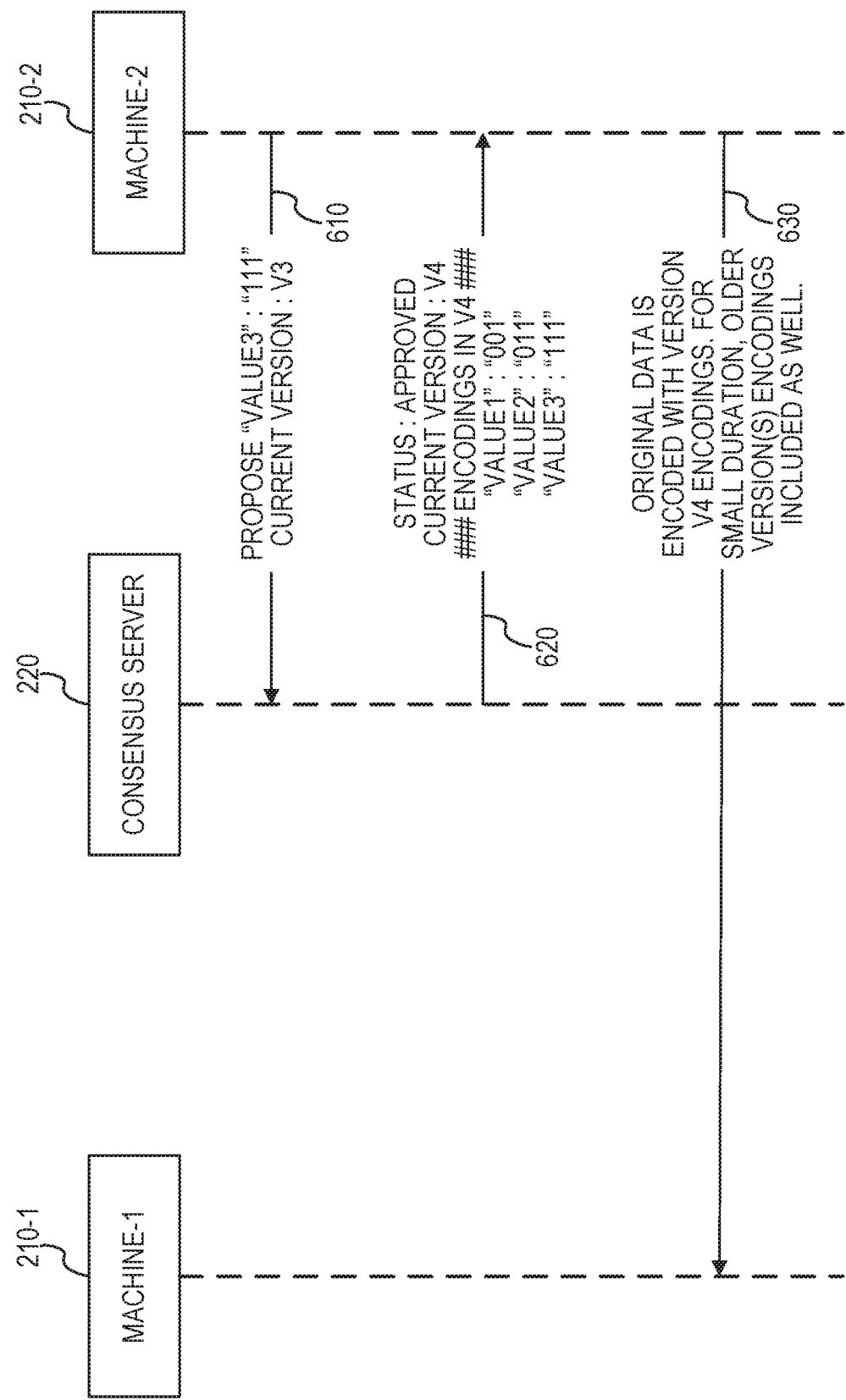
FIG. 6 illustrates a sequence diagram for a use case of the adaptive encoding network in which an encoding assignment is approved and then implemented in subsequent messages, in accordance with some example embodiments.

FIG. 6 illustrates a sequence diagram for a use case of the adaptive encoding network 150 in which an encoding assignment is approved and then implemented in subsequent messages, in accordance with some example embodiments. In one example, a third version (V3) of an encoding assignment is currently being implemented for VALUE3. At operation 610, the machine 210-2 transmits a proposal for a new encoding assignment for VALUE3 in which VALUE3 is to be encoded as "111". This transmitted proposal at operation 610 may include the version identifier (V3) of the encoding assignment currently being implemented. At operation 620, the consensus server 220 approves the encoding assignment proposed by the machine 210-2 and transmits the approval to the machine 210-2 along with a version identifier (V4) for the new current encoding assignment that has just been approved by the consensus server 220. Both the consensus server 220 and the machine 210-2 may store the new encoding assignment ("VALUE3": "111") along with its corresponding version identifier (V4). The machine 210-2 uses the fourth version (V4) of the new encoding assignment "VALUE3": "111" in a message from the machine 210-2 to the machine 210-1. In some example embodiments, in order to ensure that the machine 210-1 is able to properly interpret the message from the machine 210-2, for a short duration of time following the approval of the newest version (V4) of the encoding assignment for VALUE3, the machine 210-2 also includes the older versions of encoding assignments for VALUE3 in messages using VALUE3. By including the older version(s) of encodings, the machine 210-2 avoids a situation in which the machine 210-1 has not yet received the latest encoding assignment(s) from the consensus server 220.

Figure 7:
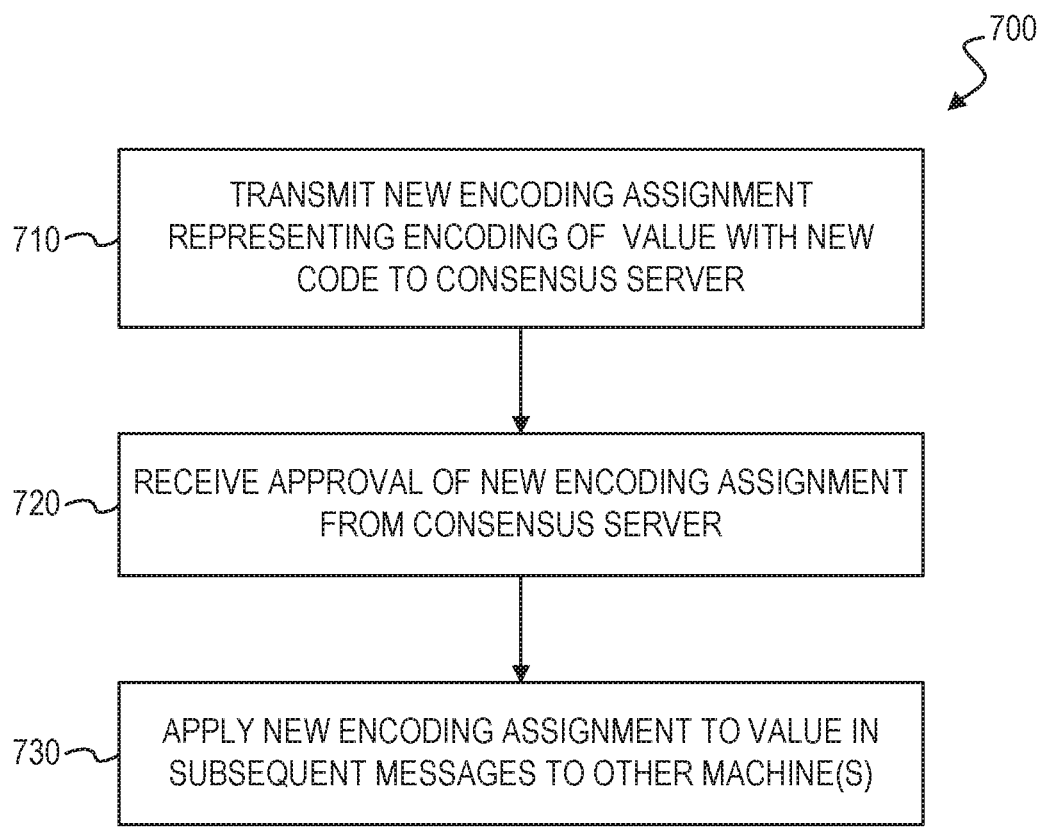
FIG. 7 is a flowchart illustrating a method of improving the functioning of a computer system by implementing an adaptive encoding system, in accordance with some example embodiments.

FIG. 7 is a flowchart illustrating a method 700 of improving the functioning of a computer system by implementing the adaptive encoding system 150, in accordance with some example embodiments. The operations of the method 700 can be performed by a system or modules of a system. The operations of the method 700 can be performed by processing logic that can comprise hardware (e.g., circuitry, dedicated logic, programmable logic, microcode, etc.), software (e.g., instructions run on a processing device), or a combination thereof. In one example embodiment, the method 700 is performed by the machine 210 of the adaptive encoding network 150 of FIGS. 1 and 2, or any combination of one or more of its components or modules (e.g., the heuristics module 214, the encoder/decoder module 216, the consensus module 218), as described above.

At operation 710, the machine 210 transmits a new encoding assignment for a value to a consensus server 220. In some example embodiments, the new encoding assignment represents an encoding of the value with a new code.

At operation 720, the machine 210 receives an approval of the new encoding assignment from the consensus server 220. In some example embodiments, the approval of the new encoding assignment from the consensus server 220 may also include a corresponding version identifier for the newly approved encoding assignment.

At operation 730, the machine 210, in response to or otherwise based on the receiving of the approval of the new encoding assignment from the consensus server 220 at operation 720, applies the new encoding assignment to the value in subsequent messages from the machine 210 to one or more other machines 210. In some example embodiments, the applying of the new encoding assignment comprises including the new code of the new encoding assignment in the subsequent messages in association with the value. In some example embodiments, the applying the new encoding assignment further comprises including a version identifier for the new code in the subsequent messages.

In some example embodiments, the applying the encoding assignment further comprises including an old code of an old encoding assignment in the subsequent messages in association with the value, the old encoding assignment having been previously approved by the consensus server 220 and applied to previous messages from the machine 210 to the one or more other machines 210 prior to the approval of the new encoding assignment. In some example embodiments, the applying the new encoding assignment further comprises including a version identifier for the new code and another version identifier for the old code in the subsequent messages. In some example embodiments, the applying the new encoding assignment further comprises determining a non-peak window of time based on the non-peak window of time having an amount of network traffic that is below a threshold amount of network traffic, and then waiting to apply the new encoding assignment until the non-peak window of time.

It is contemplated that the operations of the method 700 can incorporate any of the other features disclosed herein.

Figure 8:
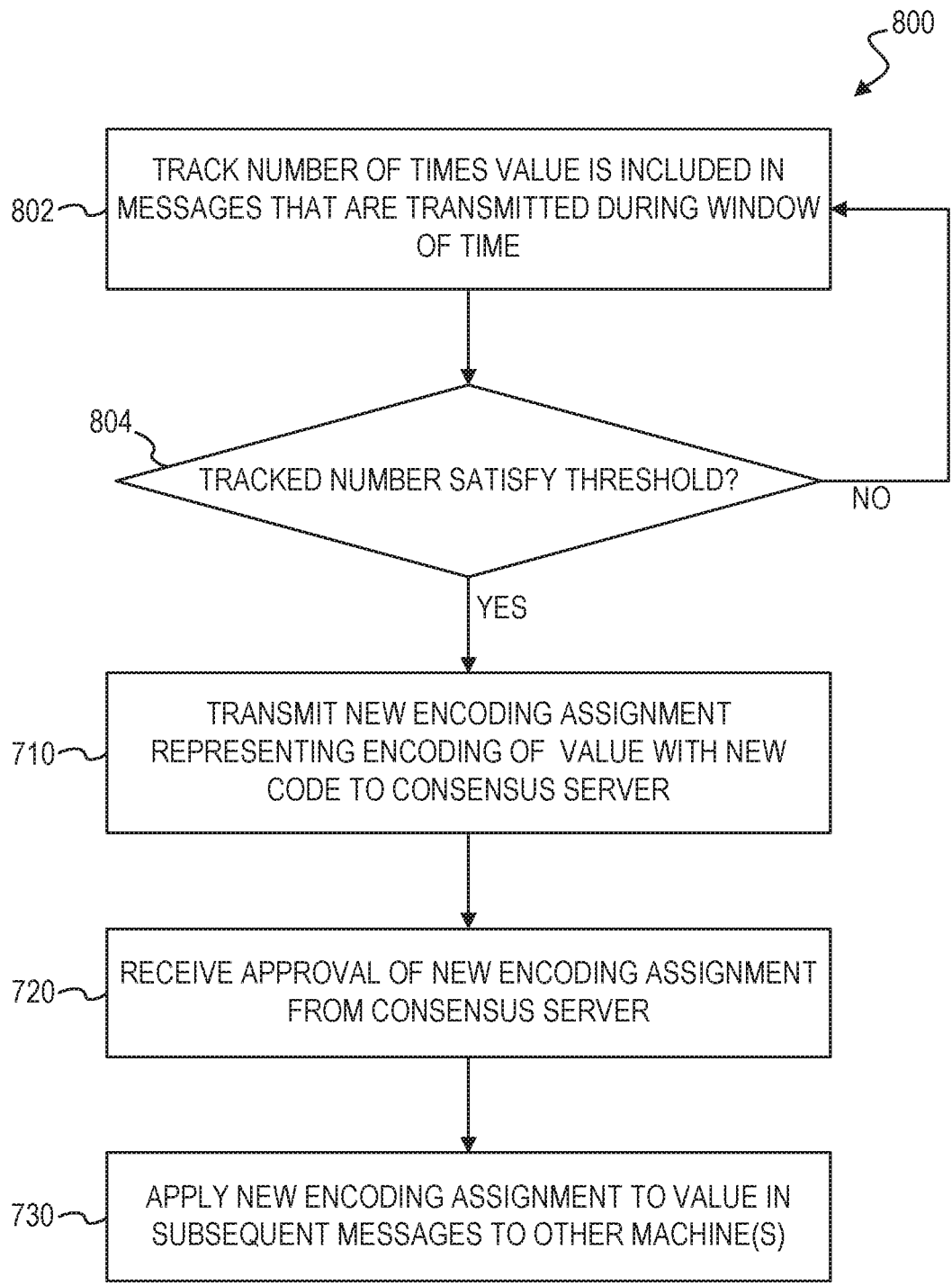
FIG. 8 is a flowchart illustrating another method of improving the functioning of a computer system by implementing an adaptive encoding network, in accordance with some example embodiments.

FIG. 8 is a flowchart illustrating another method 800 of improving the functioning of a computer system by implementing the adaptive encoding network 150, in accordance with sonic example embodiments. The operations of the method 800 can be performed by a system or modules of a system. The operations of method 800 can be performed by processing logic that can comprise hardware (e.g., circuitry, dedicated logic, programmable logic, microcode, etc.), software (e.g., instructions run on a processing device), or a combination thereof. In one example embodiment, the method 800 is performed by the machine 210 of the adaptive encoding network 150 of FIGS. 1 and 2, or any combination of one or more of its components or modules (e.g., the heuristics module 214, the encoder/decoder module 216, the consensus module 218), as described above.

In some example embodiments, the method 800 comprises operations 802 and 804 being performed prior to the performance of operations 710, 720, and 730 of the method 700 in FIG. 7.

At operation 802, the machine 210 tracks a number of times (e.g., a count) that the value is included in messages that are transmitted during a particular window of time. At operation 804, the machine 210 determines whether or not the tracked number of times satisfies a threshold number of times (e.g., whether the tracked number of times equals or exceeds the threshold number of times). If the machine 210 determines that the tracked number of times does not satisfy the threshold number of times, then the machine 210 continues to track the number of times at operation 802. If the machine 210 determines that the tracked number of times does satisfy the threshold number of times, then the machine 210 proceeds to operation 710, where the machine 210 transmits a new encoding assignment for the value to the consensus server 220, as previously discussed.

It is contemplated that the operations of the method 800 can incorporate any of the other features disclosed herein.

Figure 9:
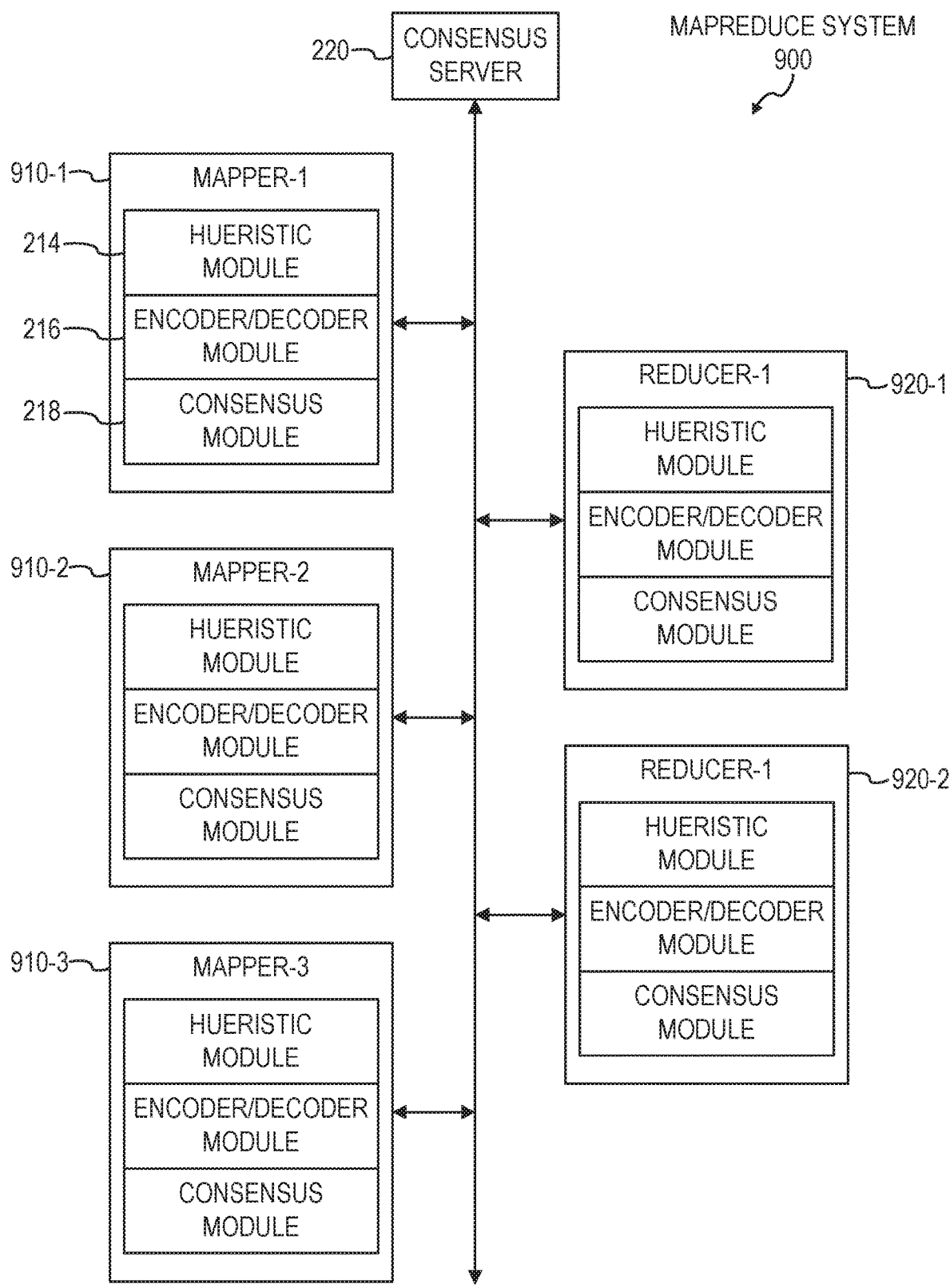
FIG. 9 illustrates an adaptive encoding network being implemented in a MapReduce environment, in accordance with some example embodiments.

FIG. 9 illustrates an adaptive encoding network 150 being implemented in a MapReduce system 900, in accordance with some example embodiments. In some example embodiments, the MapReduce system 900 comprises a programming model and an associated implementation for processing and generating big data sets with a parallel, distributed algorithm on a cluster. A MapReduce program may be composed of a map procedure that performs filtering and sorting of data (e.g., filtering and sorting data into queues) and a reduce procedure that performs a summary operation on the filtered and sorted data (e.g., counting the number of certain types of data in each queue, yielding data type frequencies). The MapReduce system 900 orchestrates the processing by managing distributed servers, running the various tasks in parallel, managing all communications and data transfers between the various parts of the system, and providing for redundancy and fault tolerance. The MapReduce system 900 processes parallelizable problems across large datasets using a large number of computers (e.g., nodes), collectively referred to as a cluster (e.g., if all nodes are on the same local network and use similar hardware) or a grid (e.g., if the nodes are shared across geographically and administratively distributed systems and use more heterogeneous hardware). Processing can occur on data stored either in a filesystem (e.g., unstructured data) or in a database (e.g., structured data). The MapReduce system 900 can take advantage of the locality of data, processing it near the place it is stored in order to minimize communication overhead.

In some example embodiments, the MapReduce system 900 comprises a plurality of mappers 910 (e.g., MAPPER-1, MAPPER-2, and MAPPER-3 in FIG. 9) and a plurality of reducers 920 (e.g., REDUCER-1 and REDUCER-2 in FIG. 9). The mappers 910 and reducers 920 may each comprise nodes that perform operations or tasks of the MapReduce system 900. In some example embodiments, the MapReduce system 900 splits an input dataset into independent chunks that are processed by the mappers 910 in a completely parallel manner. The MapReduce system 900 sorts the outputs of the mappers 910, which are then input to the reducers 920, and the reducers 920 may process each group of output data, per key, in parallel. Both the inputs and the outputs of may be stored in a file-system.

Since implementation of the MapReduce system 900 involves communication of data between the mappers 910 and the reducers 920, in some example embodiments, the adaptive encoding network 150 is implemented in the MapReduce system 900 to make such communication more effective and efficient. In some example embodiments, each one of the mappers 910 and the reducers 920 in the MapReduce system 900 comprises a corresponding heuristic module 214, encoder/decoder module 216, and consensus module 218, and each consensus module 218 is communicatively coupled to the consensus server 220 to enable management (e.g., approval and rejection) of encoding assignments, as previously discussed.

In some example embodiments, the machines 210 track counts for multiple values of the same key. For example, a key of "returnAtrribute" may have many different properties that are tracked separately, such as "returnWithin/unit" and "returnShipentPAyee/refundMethodTypes." This multi-dimension metric tracking may be performed autonomously by each machine 210 without prespecification. The tracked multi-dimension counts may be used by the machines 210 to generate and request approval from the consensus server 220 of encoding assignments for the corresponding values of each key.

Figure 10:
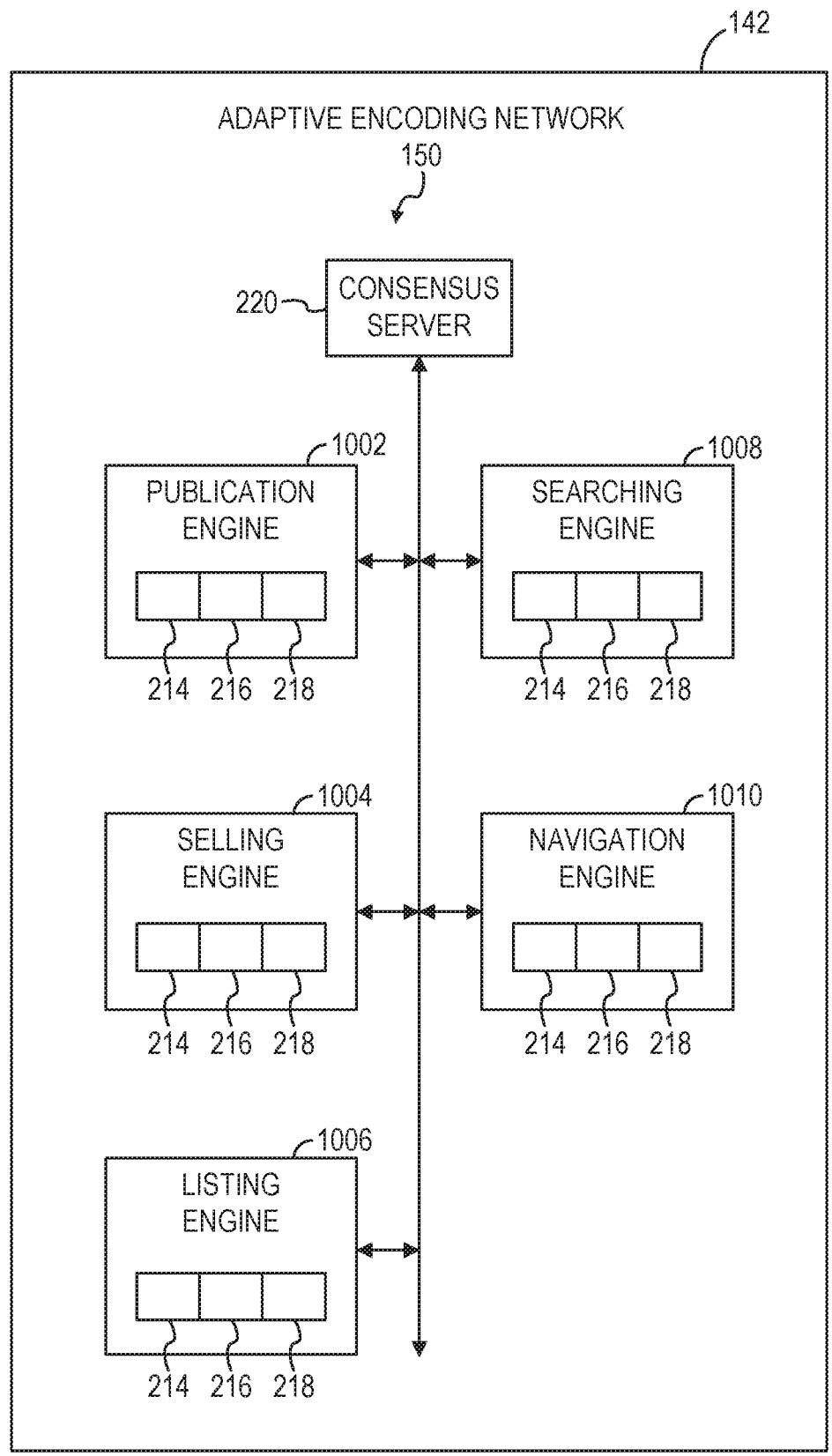
FIG. 10 is a block diagram illustrating various components of an adaptive encoding network being implemented on various services within a network-based publication system, in accordance with some example embodiments.

FIG. 10 is a block diagram illustrating various components of the adaptive encoding network 150 being implemented on various services 1002, 1004, 1006, 1008, and 1010 within the network-based publication system 142, in accordance with some example embodiments. The publication system 142 can be hosted on dedicated or shared server machines that are communicatively coupled to enable communications between server machines. The services themselves are communicatively coupled (e.g., via appropriate interfaces) to each other and to various data sources, so as to allow information to be passed between the services or so as to allow the services to share and access common data. Furthermore, the services can access one or more databases 126 via the database servers 124.

The publication system 142 can provide a number of publishing, listing, and/or price-setting mechanisms whereby a seller (also referred to as a first user) can list (or publish information concerning) goods or services for sale or barter, a buyer (also referred to as a second user) can express interest in or indicate a desire to purchase or barter such goods or services, and a transaction (such as a trade) can be completed pertaining to the goods or services. To this end, the publication system 142 can comprise at least one publication engine 1002 and one or more selling engines 1004. The publication engine 1002 can publish information, such as item listings or product description pages, on the publication system 142. In some embodiments, the selling engines 1004 can comprise one or more fixed-price engines that support fixed-price listing and price setting mechanisms and one or more auction engines that support auction-format listing and price setting mechanisms (e.g., English, Dutch, Chinese, Double, Reverse auctions, etc.). The various auction engines can also provide a number of features in support of these auction-format listings, such as a reserve price feature whereby a seller can specify a reserve price in connection with a listing and a proxy-bidding feature whereby a bidder can invoke automated proxy bidding. The selling engines 1004 can further comprise one or more deal engines that support merchant-generated offers for products and services.

A listing engine 1006 allows sellers to conveniently author listings of items or authors to author publications. In one embodiment, the listings pertain to goods or services that a user (e.g., a seller) wishes to transact via the publication system 142. In some embodiments, the listings can be an offer, deal, coupon, or discount for the good or service. Each good or service is associated with a particular category. The listing engine 1006 can receive listing data such as title, description, and aspect name/value pairs. Furthermore, each listing for a good or service can be assigned an item identifier. In other embodiments, a user can create a listing that is an advertisement or other form of information publication. The listing information can then be stored to one or more storage devices coupled to the publication system 142 (e.g., databases 126). Listings also can comprise product pages that display a product and information (e.g., product title, specifications, descriptions, and reviews) associated with the product. In some embodiments, the product page can include an aggregation of item listings that correspond to the product described on the product page.

The listing engine 1006 can also allow buyers to conveniently author listings or requests for items desired to be purchased. In some embodiments, the listings can pertain to goods or services that a user (e.g., a buyer) wishes to transact via the publication system 142. Each good or service is associated with a particular category. The listing engine 1006 can receive as much or as little listing data, such as title, description, and aspect name/value pairs, that the buyer is aware of about the requested item. In some embodiments, the listing engine 1006 can parse the buyer's submitted item information and can complete incomplete portions of the listing. For example, if the buyer provides a brief description of a requested item, the listing engine 1006 can parse the description, extract key terms, and use those terms to make a determination of the identity of the item. Using the determined item identity, the listing engine 1006 can retrieve additional item details for inclusion in the buyer item request. In some embodiments, the listing engine 1006 can assign an item identifier to each listing for a good or service.

In some embodiments, the listing engine 1006 allows sellers to generate offers for discounts on products or services. The listing engine 1006 can receive listing data, such as the product or service being offered, a price and/or discount for the product or service, a time period for which the offer is valid, and so forth. In some embodiments, the listing engine 1006 permits sellers to generate offers from the sellers' mobile devices. The generated offers can be uploaded to the publication system 142 for storage and tracking.

Searching the publication system 142 is facilitated by a searching engine 1008. For example, the searching engine 1008 enables keyword queries of listings published via the publication system 142. In example embodiments, the searching engine 1008 receives the keyword queries from a device of a user and conducts a review of the storage device storing the listing information. The review will enable compilation of a result set of listings that can be sorted and returned to the client device 110 of the user. The searching engine 1008 can record the query (e.g., keywords) and any subsequent user actions and behaviors (e.g., navigations).

The searching engine 1008 also can perform a search based on the location of the user. A user can access the searching engine 1008 via a mobile device and generate a search query, Using the search query and the user's location, the searching engine 1008 can return relevant search results for products, services, offers, auctions, and so forth to the user. The searching engine 1008 can identify relevant search results both in a list form and graphically on a map. Selection of a graphical indicator on the map can provide additional details regarding the selected search result. In some embodiments, the user can specify as part of the search query a radius or distance from the user's current location to limit search results.

The searching engine 1008 also can perform a search based on an image. The image can be taken from a camera or imaging component of a client device or can be accessed from storage.

In a further example, a navigation engine 1010 allows users to navigate through various categories, catalogs, or inventory data structures according to which listings can be classified within the publication system 142. For example, the navigation engine 1010 allows a user to successively navigate down a category tree comprising a hierarchy of categories (e.g., the category tree structure) until a particular set of listings is reached. Various other navigation applications within the navigation engine 1010 can be provided to supplement the searching and browsing applications. The navigation engine 1010 can record the various user actions (e.g., clicks) performed by the user in order to navigate down the category tree.

Since implementation of the publication system 142 may involve communication of data between the services of the publication system, such as services 1002, 1004, 1006, 1008, and 1010, in some example embodiments, the adaptive encoding network 150 is implemented in the publication system 142 to make such communication more effective and efficient. In some example embodiments, one or more of the services 1002, 1004, 1006, 1008, and 1010 in the publication system 142 each comprises a corresponding heuristic module 214, encoder/decoder module 216, and consensus module 218, and each consensus module 218 is communicatively coupled to the consensus server 220 to enable management (e.g., approval and rejection) of encoding assignments, as previously discussed.

It is contemplated that any features of any embodiments disclosed herein can be combined with any other features of any other embodiments disclosed herein. Accordingly, any such hybrid embodiments are within the scope of the present disclosure.

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

The modules, methods, applications and so forth described in conjunction with FIGS. 1-10 are implemented in some embodiments in the context of a machine and an associated software architecture. The sections below describe representative software architecture(s) and machine (e.g., hardware) architecture that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things." While yet another combination produces a server computer for use within a cloud computing architecture. Not all combinations of such software and hardware architectures are presented here as those of skill in the art can readily understand how to implement the features of the present disclosure in different contexts from the disclosure contained herein.

Figure 11:
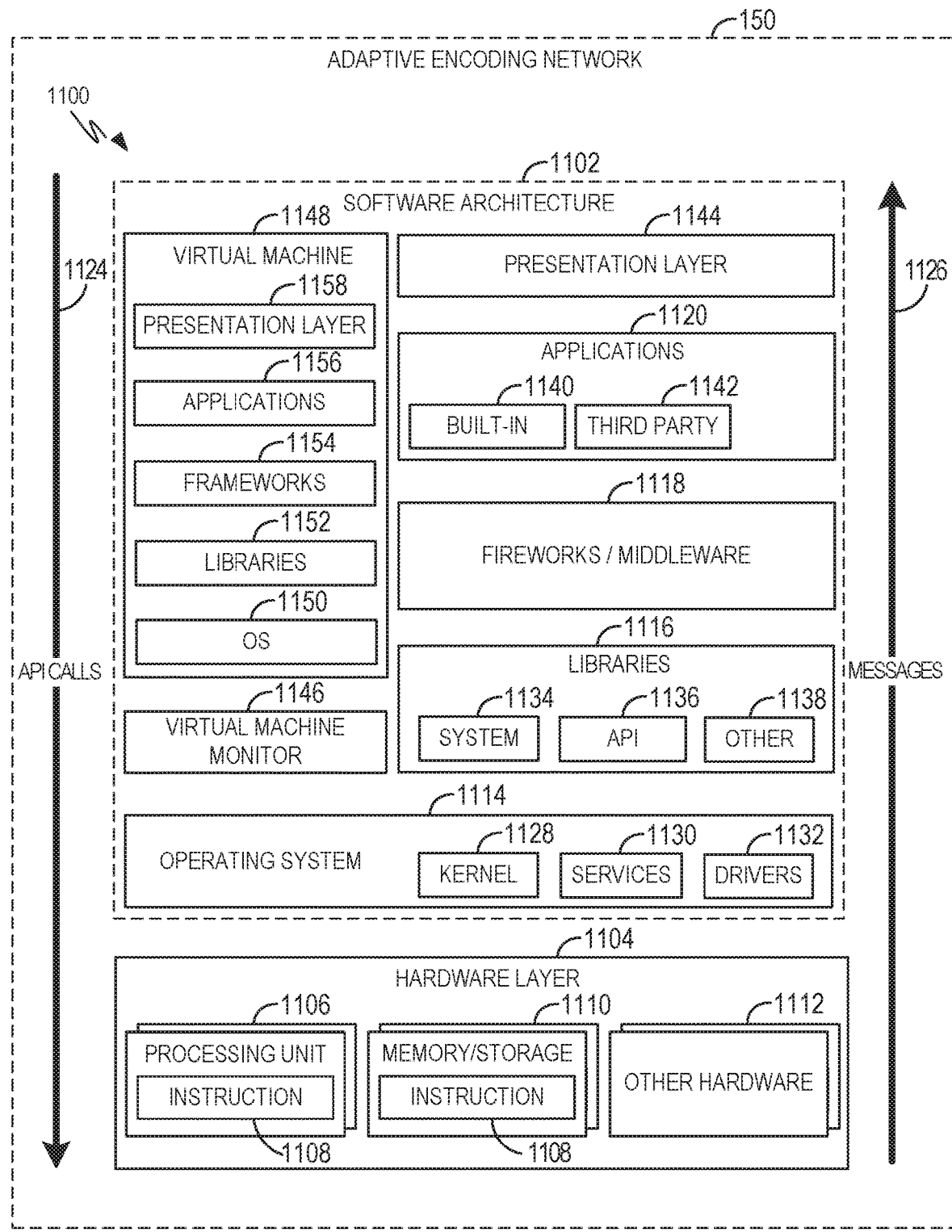
FIG. 11 is a block diagram illustrating a representative software architecture, in accordance with some example embodiments.

FIG. 11 is a block diagram 1100 illustrating a representative software architecture 1102, which may be used in conjunction with various hardware architectures herein described, such as within the machines 210 or the consensus server 220 of the adaptive encoding network 150. FIG. 11 is merely a non-limiting example of a software architecture 1102 and it will be appreciated that many other architectures may be implemented to facilitate the functionality described herein. The software architecture 1102 may be executing on hardware such as a machine 1200 of FIG. 12 that includes, among other things, processors 1010, memory/storage 1030, and I/O components 1050. A representative hardware layer 1104 is illustrated in FIG. 11 and can represent, for example, the machine 1200 of FIG. 12. The representative hardware layer 1104 comprises one or more processing units 1106 having associated executable instructions 1108. The executable instructions 1108 represent the executable instructions of the software architecture 1102, including implementation of the methods, modules, and features disclosed above with respect to FIGS. 1-10. The hardware layer 1104 also includes memory and/or storage modules 1110, which also have the executable instructions 1108. The hardware layer 1104 may also comprise other hardware 1112, which represents any other hardware of the hardware layer 1104, such as the other hardware illustrated as part of the machine 1200.

In the example architecture of FIG. 11, the software architecture 1102 may be conceptualized as a stack of layers where each layer provides particular functionality. For example, the software architecture 1102 may include layers such as an operating system 1114, libraries 1116, frameworks/middleware 1118, applications 1120, and a presentation layer 1144. Operationally, the applications 1120 and/or other components within the layers may invoke application programming interface (API) calls 1124 through the software stack and receive a response, returned values, and so forth, illustrated as messages 1126, in response to the API calls 1124. The layers illustrated are representative in nature and not all software architectures have all layers. For example, some mobile or special purpose operating systems may not provide a frameworks/middleware 1118, while others may provide such a layer. Other software architectures may include additional or different layers.

The operating system 1114 may manage hardware resources and provide common services. The operating system 1114 may include, for example, a kernel 1128, services 1130, and drivers 1132. The kernel 1128 may act as an abstraction layer between the hardware and the other software layers. For example, the kernel 1128 may be responsible for memory management, processor management (e.g., scheduling), component management, networking, security settings, and so on. The services 1130 may provide other common services for the other software layers. The drivers 1132 may be responsible for controlling or interfacing with the underlying hardware. For instance, the drivers 1132 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1116 may provide a common infrastructure that may be utilized by the applications 1120 or other components or layers. The libraries 1116 typically provide functionality that allows other software modules to perform tasks in an easier fashion than to interface directly with the underlying operating system 1114 functionality (e.g., kernel 1128, services 1130, and/or drivers 1132). The libraries 1116 may include system libraries 1134 (e.g., C standard library) that may provide functions such as memory allocation functions, string manipulation functions, mathematic functions, and the like. In addition, the libraries 1116 may include API libraries 1136 such as media libraries (e.g., libraries to support presentation and manipulation of various media formats such as MPEG4, H.264, MP3, AAC, AMR, JPG, PNG), graphics libraries (e.g., an OpenGL, framework that may be used to render 2D and 3D graphic content on a display), database libraries (e.g., SQLite that may provide various relational database functions), web libraries (e.g., WebKit that may provide web browsing functionality), and the like. The libraries 1116 may also include a wide variety of other libraries 1138 to provide many other APIs to the applications 1120 and other software components/modules.

The frameworks/middleware 1118 may provide a higher-level common infrastructure that may be utilized by the applications 1120 or other software components/modules. For example, the frameworks/middleware 1118 may provide various graphic user interface (GUI) functions, high-level resource management, high-level location services, and so forth. The frameworks/middleware 1118 may provide a broad spectrum of other APIs that may be utilized by the applications 1120 or other software components/modules, some of which may be specific to a particular operating system or platform.

The applications 1120 include built-in applications 1140 or third party applications 1142. Examples of representative built-in applications 1140 may include, but are not limited to, a contacts application, a browser application, a book reader application, a location application, a media application, a messaging application, or a game application. The third party applications 1142 may include any of the built in applications 1140 as well as a broad assortment of other applications. In a specific example, the third party application 1142 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third party application 1142 may invoke the API calls 1124 provided by the mobile operating system such as the operating system 1114 to facilitate functionality described herein.

The applications 1120 may utilize built-in operating system functions (e.g., kernel 1128, services 1130, and/or drivers 1132), libraries (e.g., system libraries 1134, API libraries 1136, and other libraries 1138), and frameworks/middleware 1118 to create user interfaces to interact with users of the system. Alternatively, or additionally, in some systems, interactions with a user may occur through a presentation layer, such as the presentation layer 1144. In these systems, the application/module "logic" can be separated from the aspects of the application/module that interact with a user.

Some software architectures utilize virtual machines. In the example of FIG. 11, this is illustrated by a virtual machine 1148. A virtual machine creates a software environment where applications/modules can execute as if they were executing on a hardware machine (e.g., the machine 1200 of FIG. 12). A virtual machine 1148 is hosted by a host operating system (e.g., operating system 1114) and typically, although not always, has a virtual machine monitor 1146, which manages the operation of the virtual machine 1148 as well as the interface with the host operating system (e.g., operating system 1114). A software architecture executes within the virtual machine 1148 such as an operating system 1150, libraries 1152, frameworks 1154, applications 1156, or presentation layer 1158. These layers of software architecture executing within the virtual machine 1148 can be the same as corresponding layers previously described or may be different.

Figure 12:
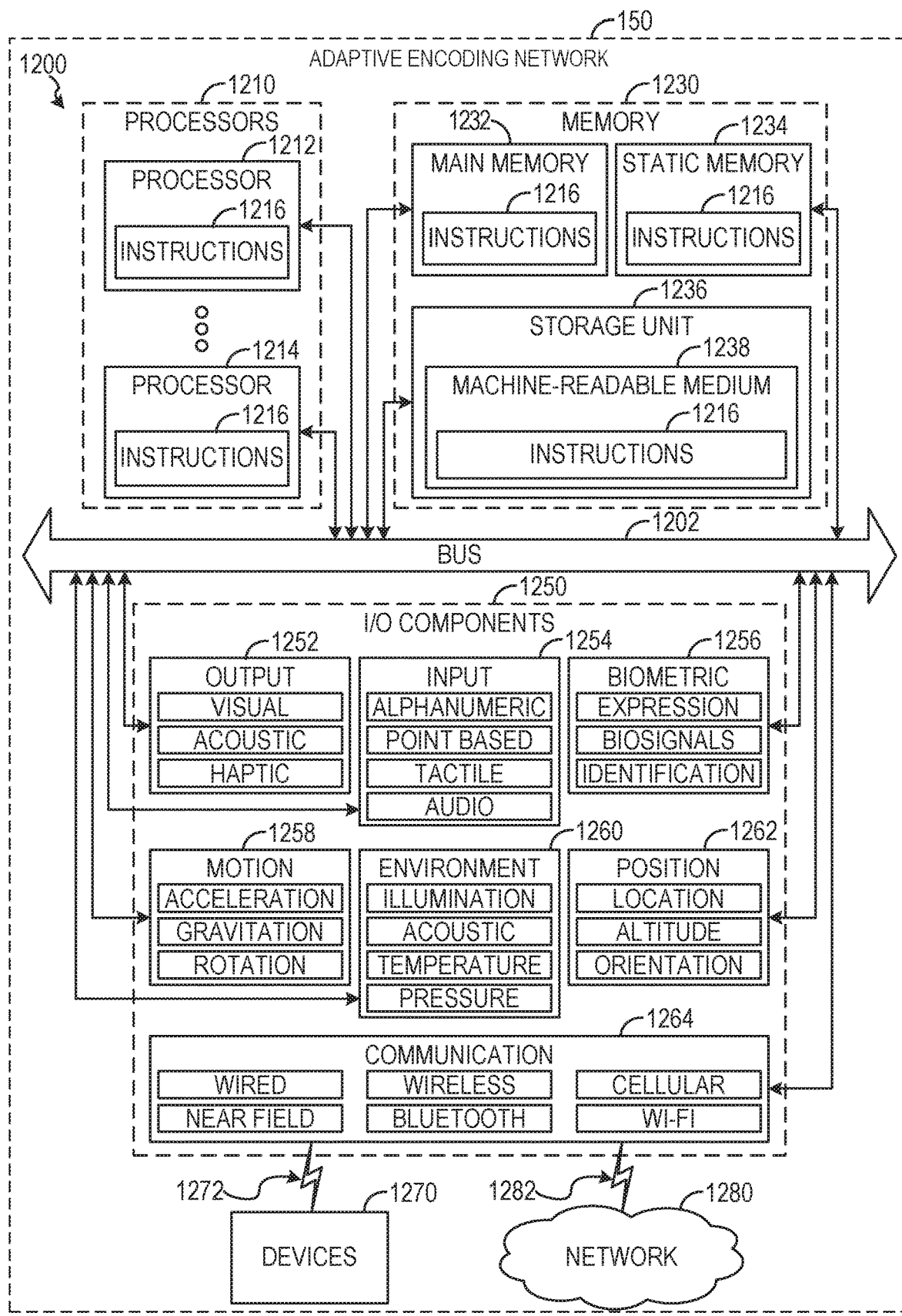
FIG. 12 is a diagrammatic representation of a machine in the form of a computer system within which a set of instructions may be executed for causing the machine to perform any one or more of the methodologies discussed herein, according to an example embodiment.

FIG. 12 is a block diagram illustrating components of a machine 1200, according to some example embodiments, able to read instructions from a machine-readable medium (e.g., a machine-readable storage medium) and perform any one or more of the methodologies discussed herein. Specifically, FIG. 12 shows a diagrammatic representation of the machine 1200 in the example form of a computer system, within which instructions 1216 (e.g., software, a program, an application, an applet, an app, or other executable code) for causing the machine 1200 to perform any one or more of the methodologies discussed herein may be executed. For example, the instructions 1216 may cause the machine 1200 to execute any one of the respective methods 700 and 800 of FIGS. 7 and 8. Additionally, or alternatively, the instructions 1216 may implement any combination of one or more of the components of FIG. 2, and so forth. For example, the machines 210 or the consensus server 220 of the adaptive encoding network 150 may comprise the machine 1200.

The instructions 1216 transform the machine 1200 into a particular machine programmed to carry out the described and illustrated functions in the manner described. In alternative embodiments, the machine 1200 operates as a standalone device or may be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1216, sequentially or otherwise, that specify actions to be taken by machine 1200. Further, while only a single machine 1200 is illustrated, the term "machine" shall also be taken to include a collection of machines 1200 that individually or jointly execute the instructions 1216 to perform any one or more of the methodologies discussed herein.

The machine 1200 may include processors 1210, memory 1230, and I/O components 1250, which may be configured to communicate with each other such as via a bus 1202. In an example embodiment, the processors 1210 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (REIC), another processor, or any suitable combination thereof) may include, for example, processor 1212 and processor 1214 that may execute instructions 1216. The term "processor" is intended to include multi-core processor that may comprise two or more independent processors (sometimes referred to as "cores") that may execute instructions contemporaneously. Although FIG. 12 shows multiple processors 1210, the machine 1200 may include a single processor with a single core, a single processor with multiple cores (e.g., a multi-core process), multiple processors with a single core, multiple processors with multiples cores, or any combination thereof.

The memory/storage 1230 may include a memory 1232, such as a main memory, or other memory storage, and a storage unit 1236, both accessible to the processors 1210 such as via the bus 1202. The storage unit 1236 and memory 1232 store the instructions 1216 embodying any one or more of the methodologies or functions described herein. The instructions 1216 may also reside, completely or partially, within the memory 1232, within the storage unit 1236, within at least one of the processors 1210 (e.g., within the processor's cache memory), or any suitable combination thereof, during execution thereof by the machine 1200. Accordingly, the memory 1232, the storage unit 1236, and the memory of processors 1210 are examples of machine-readable media.

As used herein, "machine-readable medium" means a device able to store or carry instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 1216. The term "machine-readable medium" shall also be taken to include any medium, or combination of multiple media, that is capable of storing or carrying instructions (e.g., instructions 1216) for execution by a machine (e.g., machine 1200), such that the instructions, when executed by one or more processors of the machine 1200 (e.g., processors 1210), cause the machine 1200 to perform any one or more of the methodologies described herein. Accordingly, a "machine-readable storage medium" refers to a single storage apparatus or device, as well as "cloud-based" storage systems or storage networks that include multiple storage apparatus or devices. The term "machine-readable medium" includes transmission media such as signals.

The I/O components 1250 may include a wide variety of components to receive input, provide output, produce output, transmit information, exchange information, capture measurements, and so on. The specific I/O components 1250 that are included in a particular machine will depend on the type of machine. For example, portable machines such as mobile phones will likely include a touch input device or other such input mechanisms, while a headless server machine will likely not include such a touch input device. It will be appreciated that the I/O components 1250 may include many other components that are not shown in FIG. 12. The I/O components 1250 are grouped according to functionality merely for simplifying the following discussion and the grouping is in no way limiting. In various example embodiments, the I/O components 1250 may include output components 1252 and input components 1254. The output components 1252 may include visual components (e.g., a display such as a plasma display panel (PDP), a light emitting diode (LEI)) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1254 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1250 may include biometric components 1256, motion components 1258, environmental components 1260, or position components 1262 among a wide array of other components. For example, the biometric components 1256 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1258 may include acceleration sensor components (e.g., accelerometer), gravitation sensor components, rotation sensor components (e.g., gyroscope), and so forth. The environmental components 1260 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1262 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1250 may include communication components 1264 operable to couple the machine 1200 to a network 1280 or devices 1270 via coupling 1282 and coupling 1272 respectively. For example, the communication components 1264 may include a network interface component or other suitable device to interface with the network 1280. In further examples, communication components 1264 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1270 may be another machine or any of a wide variety of peripheral devices (e.g., a peripheral device coupled via a Universal Serial Bus (USB)).

Moreover, the communication components 1264 may detect identifiers or include components operable to detect identifiers. For example, the communication components 1264 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF4I7, Ultra Code, UCC RSS-2D bar code, and other optical codes), or acoustic detection components (e.g., microphones to identify tagged audio signals). In addition, a variety of information may be derived via the communication components 1264, such as, location via Internet Protocol (IP) geo-location, location via Wi-Fi® signal triangulation, location via detecting a NFC beacon signal that may indicate a particular location, and so forth.

In various example embodiments, one or more portions of the network 1280 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 1280 or a portion of the network 1280 may include a wireless or cellular network and the coupling 1282 may be a Code Division Multiple Access (CDMA) connection, a Global System for Mobile communications (GSM) connection, or other type of cellular or wireless coupling. In this example, the coupling 1282 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed:Packet Access (HSPA), Worldwide Interoperability for Microwave Access (WiMAX), Long Term Evolution (LTE) standard, others defined by various standard setting organizations, other long range protocols, or other data transfer technology.

The instructions 1216 may be transmitted or received over the network 1280 using a transmission medium via a network interface device (e.g., a network interface component included in the communication components 1264) and utilizing any one of a number of well-known transfer protocols (e.g., hypertext transfer protocol (HTTP)). Similarly, the instructions 1216 may be transmitted or received using a transmission medium via the coupling 1272 (e.g., a peer-to-peer coupling) to devices 1270. The term "transmission medium" shall be taken to include any computer-readable medium that is capable of encoding or carrying instructions 1216 for execution by the machine 1200, and includes digital or analog communications signals or other intangible medium to facilitate communication of such software.

The following numbered examples are embodiments.

1. A computer-implemented method comprising:
   transmitting, by a first machine having a memory and at least one hardware processor, a new encoding assignment for a value to a consensus server, the new encoding assignment representing an encoding of the value with a new code;
   receiving, by the first machine, an approval of the new encoding assignment from the consensus server; and
   based on the receiving of the approval of the new encoding assignment from the consensus server, applying, by the first machine, the new encoding assignment to the value in subsequent messages from the first machine to one or more other machines, the applying of the new encoding assignment comprising including the new code of the new encoding assignment in the subsequent messages in association with the value.

2. The computer-implemented method of example 1, further comprising tracking, by the first machine, a number of times the value is included in messages that are transmitted during a first window of time, wherein the transmitting of the new coding assignment for the value to the consensus server is based on the tracked number of times satisfying a threshold number of times.

3. The computer-implemented method of example 1 or example 2, wherein the applying the encoding assignment further comprises including an old code of an old encoding assignment in the subsequent messages in association with the value, the old encoding assignment having been previously approved by the consensus server and applied to previous messages from the first machine to the one or more other machines prior to the approval of the new encoding assignment.

4. The computer-implemented method of any one of examples 1 to 3, wherein the applying the new encoding assignment further comprises including a version identifier for the new code and another version identifier for the old code in the subsequent messages.

5. The computer-implemented method of any one of examples 1 to 4, wherein the applying the new encoding assignment further comprises:
   determining a non-peak window of time based on the non-peak window of time having an amount of network traffic that is below a threshold amount of network traffic; and
   waiting to apply the new encoding assignment until the non-peak window of time.

6. The computer-implemented method of any one of examples 1 to 5, wherein the applying the new encoding assignment further comprises including a version identifier for the new code in the subsequent messages.

7. The computer-implemented method of any one of examples 1 to 6, further comprising:
   transmitting, by the first machine, another new encoding assignment for the value to the consensus server, the other new encoding assignment representing another encoding of the value with another new code;
   receiving, by the first machine, a rejection of the other new encoding assignment from the consensus server; and
   based on the receiving of the rejection of the other new encoding assignment from the consensus server, applying, by the first machine, the new encoding assignment to the value instead of the other new encoding assignment in subsequent messages from the first machine to the one or more other machines.

8. A system comprising:
   at least one processor; and
   a non-transitory computer-readable medium storing executable instructions that, when executed, cause the at least one processor to perform the method of any one of examples 1 to 7.

9. A non-transitory machine-readable storage medium, tangibly embodying a set of instructions that, when executed by at least one processor, causes the at least one processor to perform the method of any one of examples 1 to 7.

10. A machine-readable medium carrying a set of instructions that, when executed by at least one processor, causes the at least one processor to carry out the method of any one of examples 1 to 7.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Although an embodiment has been described with reference to specific example embodiments, it will be evident that various modifications and changes can be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter can be practiced. The embodiments illustrated are described in sufficient detail to enable those skilled in the art to practice the teachings disclosed herein. Other embodiments can be utilized and derived therefrom, such that structural and logical substitutions and changes can be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter can be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose can be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:
1. A computer-implemented method comprising:
   determining, by a first computing device, that a value occurs in a plurality of messages more than a threshold quantity;
   transmitting, by the first computing device to a consensus server, a new encoding assignment that specifies a new code for the value responsive to determining that the value occurs in the plurality of messages more than the threshold quantity;

receiving, by the first computing device, an approval of the new encoding assignment from the consensus server; and generating, by the first computing device, a message that represents the value using the new code responsive to receiving the approval and transmitting the message to a second computing device.

2. The computer-implemented method of claim 1, further comprising tracking, by the first computing device, a number of times the value is included in the plurality of messages, wherein determining that the value occurs in the plurality of messages more than the threshold quantity comprises comparing the tracked number of times to the threshold quantity.

3. The computer-implemented method of claim 1, wherein generating the message that represents the value using the new code comprises including an old code of an old encoding assignment for the value, the old encoding assignment having been previously approved by the consensus server prior to the approval of the new encoding assignment.

4. The computer-implemented method of claim 3, wherein generating the message that represents the value using the new code comprises including a version identifier for the new code and another version identifier for the old code in the message.

5. The computer-implemented method of claim 1, wherein generating the message that represents the value using the new code comprises:

determining a non-peak window of time by identifying an amount of network traffic that is below a threshold amount of network traffic; and waiting to generate the message until the non-peak window of time.

6. The computer-implemented method of claim 1, further comprising representing the value using the new code in subsequent messages transmitted from the first computing device to different computing devices.

7. The computer-implemented method of claim 1, further comprising:

transmitting, by the first computing device, another new encoding assignment for the value to the consensus server, the other new encoding assignment representing another encoding of the value with another new code;

receiving, by the first computing device, a rejection of the other new encoding assignment from the consensus server; and based on the receiving of the rejection of the other new encoding assignment from the consensus server, continuing, by the first computing device, to represent the value using the new code in subsequent messages from the first computing device to different computing devices.

8. A system comprising:

at least one hardware processor; and a computer-readable storage medium storing executable instructions that, when executed, cause the at least one hardware processor to perform operations comprising:

determining that a value occurs in a plurality of messages more than a threshold quantity;

transmitting a new encoding assignment that specifies a new code for the value to a consensus server responsive to determining that the value occurs in the plurality of messages more than the threshold quantity;

receiving an approval of the new encoding assignment from the consensus server; and generating a message that represents the value using the new code responsive to receiving the approval and transmitting the message to a computing device.

9. The system of claim 8, the operations further comprising tracking a number of times the value is included in the plurality of messages, wherein determining that the value occurs in the plurality of messages more than the threshold quantity comprises comparing the tracked number of times to the threshold quantity.

10. The system of claim 8, wherein generating the message that represents the value using the new code comprises including an old code of an old encoding assignment for the value, the old encoding assignment having been previously approved by the consensus server prior to the approval of the new encoding assignment.

11. The system of claim 10, wherein generating the message that represents the value using the new code comprises including a version identifier for the new code and another version identifier for the old code in the message.

12. The system of claim 8, wherein generating the message that represents the value using the new code comprises:

determining a non-peak window of time by identifying an amount of network traffic that is below a threshold amount of network traffic; and waiting to generate the message until the non-peak window of time.

13. The system of claim 8, the operations further comprising representing the value using the new code in subsequent messages transmitted to one or more computing devices.

14. The system of claim 8, further comprising:

transmitting another new encoding assignment for the value to the consensus server, the other new encoding assignment representing another encoding of the value with another new code;

receiving a rejection of the other new encoding assignment from the consensus server; and based on the receiving of the rejection of the other new encoding assignment from the consensus server, continuing to represent the value using the new code in subsequent messages transmitted to one or more computing devices.

15. A non-transitory machine-readable storage medium storing a set of instructions that, when executed by at least one processor, causes the at least one processor to perform operations comprising:

determining that a value occurs in a plurality of messages more than a threshold quantity;

transmitting a new encoding assignment for the value to a consensus server responsive to determining that the value occurs in the plurality of messages more than the threshold quantity, the new encoding assignment specifying a new code for the value;

receiving an approval of the new encoding assignment from the consensus server; and generating a message that represents the value using the new code responsive to receiving the approval and transmitting the message to a computing device.

16. The non-transitory machine-readable storage medium of claim 15, the operations further comprising tracking a number of times the value is included in the plurality of messages, wherein determining that the value occurs in the plurality of messages more than the threshold quantity comprises comparing the tracked number of times to the threshold quantity.

17. The non-transitory machine-readable storage medium of claim 15, wherein generating the message that represents the value using the new code comprises including an old code of an old encoding assignment for the value, the old encoding assignment having been previously approved by the consensus server and prior to the approval of the new encoding assignment.

18. The non-transitory machine-readable storage medium of claim 17, wherein generating the message that represents the value using the new code comprises including a version identifier for the new code and another version identifier for the old code in the message.

19. The non-transitory machine-readable storage medium of claim 15, wherein generating the message that represents the value using the new code comprises:
- determining a non-peak window of time by identifying an amount of network traffic that is below a threshold amount of network traffic; and
- waiting to generate the message until the non-peak window of time.

20. The non-transitory machine-readable storage medium of claim 15, the operations further comprising representing the value using the new code in subsequent messages communicated to one or more computing devices.

\* \* \* \* \*